United States Patent
Yagi

(10) Patent No.: US 11,767,410 B2
(45) Date of Patent: Sep. 26, 2023

(54) FLUORINATED COPOLYMER COMPOSITION AND METAL RUBBER LAMINATE

(71) Applicant: AGC Inc., Chiyoda-ku (JP)

(72) Inventor: Keisuke Yagi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 379 days.

(21) Appl. No.: 16/823,721

(22) Filed: Mar. 19, 2020

(65) Prior Publication Data

US 2020/0216636 A1 Jul. 9, 2020

Related U.S. Application Data

(63) Continuation of application No. PCT/JP2018/037277, filed on Oct. 4, 2018.

(30) Foreign Application Priority Data

Oct. 6, 2017 (JP) ................. 2017-196075

(51) Int. Cl.
*C08K 3/36* (2006.01)
*B32B 7/12* (2006.01)
*B32B 15/06* (2006.01)
*C08F 214/26* (2006.01)
*C08K 3/22* (2006.01)

(52) U.S. Cl.
CPC .................. *C08K 3/36* (2013.01); *B32B 7/12* (2013.01); *B32B 15/06* (2013.01); *C08F 214/267* (2013.01); *C08K 3/22* (2013.01); *C08F 2800/10* (2013.01); *C08K 2003/222* (2013.01); *C08K 2003/2241* (2013.01); *C08K 2201/006* (2013.01)

(58) Field of Classification Search
None
See application file for complete search history.

(56) References Cited

U.S. PATENT DOCUMENTS

| 2001/0000788 | A1 | 5/2001 | Ono et al. |
| 2011/0015342 | A1 | 1/2011 | Kose et al. |
| 2012/0190796 | A1 | 7/2012 | Funaki et al. |
| 2016/0222170 | A1* | 8/2016 | Muto ................. C08J 3/28 |

FOREIGN PATENT DOCUMENTS

| CN | 101479336 A | 7/2009 |
| JP | 2007-246619 A | 9/2007 |
| JP | 2010-235906 A | 10/2010 |
| JP | 2010-235907 A | 10/2010 |
| JP | 2013173929 A * | 9/2013 |
| JP | 2014-118536 A | 6/2014 |
| WO | WO 2009/119202 A1 | 10/2009 |
| WO | WO 2010/082633 A1 | 7/2010 |
| WO | WO 2014/084082 A1 | 6/2014 |

OTHER PUBLICATIONS

Machine translation of Ota et al. JP 2013173929A (Year: 2013).*
Aerosil A200 Datasheet.*
Datasheet for Celite (Year: 1999).*
International Search Report dated Dec. 18, 2018 in PCT/JP2018/037277 filed Oct. 4, 2018, 2 pages.
Bruno Ameduri, "From Vinylidene Fluoride (VDF) to the Applications of VDF-Containing Polymers and Copolymers: Recent Developments and Future Trends" Chemical Reviews, XP055595149, vol. 109, No. 12, Dec. 9, 2009, 2010, 216 pages.

* cited by examiner

*Primary Examiner* — Robert T Butcher
(74) *Attorney, Agent, or Firm* — Oblon, McClelland, Maier & Neustadt, L.L.P.

(57) ABSTRACT

To provide a fluorinated copolymer composition capable of forming a crosslinked rubber having favorable rubber properties and excellent metal adhesion, and a metal rubber laminate using the crosslinked rubber.
A fluorinated copolymer composition comprising a copolymer having units based on tetrafluoroethylene and units based on propylene, a copolymer having units based on tetrafluoroethylene and units based on a perfluoro(alkyl vinyl ether), or a copolymer having units based on hexafluoropropylene and units based on vinylidene fluoride, hydrophilic silica, and an acid acceptor.

19 Claims, No Drawings

FLUORINATED COPOLYMER COMPOSITION AND METAL RUBBER LAMINATE

TECHNICAL FIELD

The present invention relates to a fluorinated copolymer composition and a metal rubber laminate.

BACKGROUND ART

A crosslinked rubber formed by crosslinking a fluorinated copolymer is generally excellent in heat resistance, oil resistance and abrasion resistance and is widely used in the field of automobiles, general machines, building, aircrafts, etc. as a sealing material such as an O ring, an oil seal or a gasket. In a sealing material, the crosslinked rubber may sometimes be used as a composite material bonded to a metal. Accordingly, the crosslinked rubber is required not only to have favorable tensile strength and rubber properties such as compression set but also to be excellent in adhesion to a metal (metal adhesion). Patent Documents 1 and 2 disclose a technique of incorporating mercaptosilane and diatomaceous earth into a crosslinked rubber to improve the metal adhesion. Patent Document 3 discloses a technique of incorporating hydrophobic silica into a crosslinked rubber to improve the physical properties.

PRIOR ART DOCUMENTS

Patent Documents

Patent Document 1: JP-A-2010-235906
Patent Document 2: JP-A-2010-235907
Patent Document 3: WO2014/084082

DISCLOSURE OF INVENTION

Technical Problem

The crosslinked rubbers disclosed in Patent Documents 1 and 2 have favorable metal adhesion but are inferior in mechanical strength such as tensile strength and rubber properties such as compression set. In order to improve the rubber properties, the present inventor has further added hydrophobic silica by reference to Patent Document 3, whereupon the metal adhesion was impaired.

The present invention is to provide a fluorinated copolymer composition for forming a crosslinked rubber having favorable rubber properties and excellent metal adhesion, and a metal rubber laminate using the crosslinked rubber.

Solution to Problem

[1] A fluorinated copolymer composition comprising a copolymer having units based on tetrafluoroethylene and units based on propylene, a copolymer having units based on tetrafluoroethylene and units based on a perfluoro(alkyl vinyl ether), or a copolymer having units based on hexafluoropropylene and units based on vinylidene fluoride, both hydrophilic silica and diatomaceous earth or hydrophilic silica having a specific surface area of at least 70 m$^2$/g, and an acid acceptor.
[2] The fluorinated copolymer composition according to [1], which contains hydrophilic silica having a specific surface area of at least 70 m$^2$/g and contains no diatomaceous earth.
[3] The fluorinated copolymer composition according to [1], which contains hydrophilic silica having a specific surface area of less than 70 m$^2$/g and diatomaceous earth.
[4] The fluorinated copolymer composition according to any one of [1] to [3], which further contains a crosslinking agent.
[5] The fluorinated copolymer composition according to [4], wherein the crosslinking agent is an organic peroxide.
[6] The fluorinated copolymer composition according to any one of [1] to [5], which further contains a crosslinking aid.
[7] The fluorinated copolymer composition according to any one of [1] to [6], which further contains titanium oxide.
[8] The fluorinated copolymer composition according to any one of [1] to [7], wherein the fluorinated copolymer is the copolymer having units based on tetrafluoroethylene and units based on propylene.
[9] The fluorinated copolymer composition according to any one of [1] to [8], wherein the acid acceptor is magnesium oxide.
[10] A metal rubber laminate comprising a crosslinked rubber layer formed of a crosslinked product of the fluorinated copolymer composition as defined in any one of [1] to [9], and a metal substrate.
[11] The metal rubber laminate according to [10], wherein the crosslinked rubber layer and the metal substrate are in contact with each other.
[12] The metal rubber laminate according to [10], which has an adhesive layer between the crosslinked rubber layer and the metal substrate.
[13] A method for producing a metal rubber laminate, which comprises forming an adhesive layer on a metal substrate, forming a layer formed of the fluorinated copolymer composition as defined in any one of [1] to [9] on the adhesive layer, and crosslinking the layer formed of the composition.

Advantageous Effects of Invention

According to the fluorinated copolymer composition of the present invention, it is possible to form a crosslinked rubber having favorable rubber properties and excellent metal adhesion. The metal rubber laminated of the present invention is suitable as a sealing material.

DESCRIPTION OF EMBODIMENTS

The following definitions of terms are applicable throughout description and claims.

A "monomer" means a compound having a polymerizable unsaturated bond. The polymerizable unsaturated bond may, for example, be a double bond or a triple bond between carbon atoms.

"Units based on a monomer" generally means an atomic group directly formed by polymerization of one monomer molecule, and an atomic group obtained by chemical conversion of part of the atomic group. The "units based on a monomer" may be referred to also as "monomer units".

In this specification, the apparent specific gravity of hydrophilic silica is a value obtained in accordance with ISO787/XI.

In this specification, the specific surface area of hydrophilic silica is a value obtained by BET method as specified in ISO18852 (JIS K6430 (2008)).

In this specification, the average primary particle size of hydrophilic silica is a value obtained by measuring particle sizes of 2,500 particles or more by observation with a transmission electron microscope and calculating the number average.

<Fluorinated Copolymer Composition>

The composition of the present invention is a fluorinated copolymer composition comprising a copolymer having units based on tetrafluoroethylene (hereinafter sometimes referred to as TFE) and units based on propylene, a copolymer having TFE units and units based on a perfluoro(alkyl vinyl ether) (hereinafter sometimes referred to as PAVE), or a copolymer having units based on hexafluoropropylene (hereinafter sometimes referred to as HFP) and units based on vinylidene fluoride (hereinafter sometimes referred to as VdF), both hydrophilic silica and diatomaceous earth or hydrophilic silica having a specific surface area of at least 70 $m^2/g$, and an acid acceptor.

In a case where the composition of the present invention is a composition containing diatomaceous earth, the specific surface area of the hydrophilic silica contained in the composition is not limited. That is, the specific surface area of the hydrophilic silica may be at least 70 $m^2/g$, or may be less than 70 $m^2/g$.

On the other hand, in a case where the composition of the present invention is a composition containing hydrophilic silica having a specific surface area of at least 70 $m^2/g$, the composition may or may not contain diatomaceous earth.

Each of the copolymers in the present invention is obtained by common radical polymerization method. The radical polymerization method may, for example, be living radical polymerization method such as iodine transfer polymerization method conducting radical polymerization in the presence of iodine itself or an iodine compound.

As the copolymer having TFE units and propylene units (hereinafter sometimes referred to as P units), copolymers disclosed in WO2009/119202 and WO2017/057512 may, for example, be mentioned.

As the copolymer having HFP units and VdF units, a copolymer as disclosed in JP-A-H06-306180 may, for example, be mentioned.

As the copolymer having TFE units and PAVE units, copolymers as disclosed in U.S. Pat. No. 4,035,565 and WO2010/082633 may, for example, be mentioned.

As a preferred copolymer, the following copolymers may, for example, be mentioned.

A copolymer having TFE units and P units in a total amount of the TFE units and the P units of from 65 to 100 mol % to all units (hereinafter referred to as TFE/P copolymer). A copolymer having HFP units and VdF units in a total amount of the HFP units and VdF units of from 50 to 100 mol % to all units (hereinafter referred to as HFP/VdF copolymer). A copolymer having TFE units and PAVE units in a total amount of the TFE units and the PAVE units of from 50 to 100 mol % to all units (hereinafter referred to as TFE/PAVE copolymer). Among them, the TFE/P copolymer is preferred.

The TFE/P copolymer is preferably a copolymer in which the total amount of the TFE units and the P units is from 65 to 100 mol % to all units in the copolymer, and the molar ratio of TFE units/P units is from 30/70 to 70/30. The molar ratio of the TFE units to the P units is preferably from 45/55 to 65/35, more preferably from 50/50 to 60/40. The TFE/P copolymer may contain from 0.01 to 5.0 mass % of iodine atoms.

As units other than the TFE units and the P units, units based on monomer 1 represented by the following formula (1) are preferred.

$$CR^1R^2\!=\!CR^3\!-\!R^4\!-\!CR^5\!=\!CR^6R^7 \quad (1)$$

wherein $R^1$, $R^2$, $R^3$, $R^5$, $R^6$ and $R^7$ are each independently a hydrogen atom, a fluorine atom or a methyl group, and $R^4$ is a $C_{1-10}$ perfluoroalkylene group or a group having an etheric oxygen atom at both terminals, at one terminal or in a carbon-carbon bond of the perfluoroalkylene group).

The monomer 1 may, for example, be $CF_2\!=\!CFO(CF_2)_3OCF\!=\!CF_2$, $CF_2\!=\!CFO(CF_2)_4OCF\!=\!CF_2$, or $CH_2\!=\!CH(CF_2)_6CH\!=\!CH_2$.

The proportion of the units 1 to all units is preferably from 0.1 to 1.5 mol %, more preferably from 0.15 to 0.8 mol %, further preferably from 0.25 to 0.6 mol %.

In a case where the copolymer contains the TFE units, the P units and the units 1, the total amount of the TFE units, the P units and the units 1 to all units in the copolymer is preferably from 98 to 100 mol %. Further, the molar ratio of TFE units/P units is preferably from 30/70 to 99/1, more preferably from 30/70 to 70/30, further preferably from 40/60 to 60/40.

As units other than the TFE units, the P units and the units 1, units based on the following monomers may, for example, be mentioned.

Fluorinated olefin: monofluoroethylene, trifluoroethylene, trifluoropropylene, pentafluoropropylene, hexafluoropropylene, hexafluoroisobutylene, dichlorodifluoroethylene, vinyl fluoride, perfluorocyclobutene, pentafluorobutylene, heptafluoropentene, nonafluorohexene and undecafluoroheptene.

Hydrocarbon olefin: ethylene, 1-butene, isobutylene, pentene.

Alkyl vinyl ether: methyl vinyl ether, ethyl vinyl ether, propyl vinyl ether, butyl vinyl ether and cyclohexyl vinyl ether.

Vinyl ester: vinyl acetate, vinyl propionate, vinyl caproate and vinyl caprylate.

Monomer other than the above: vinyl chloride, vinylidene chloride and trifluorostyrene.

The proportion of other units to all units is preferably at most 2.0 mol %, more preferably at most 1.0 mol %, particularly preferably at most 0.5 mol %.

The TFE/P copolymer preferably contains iodine atoms. The proportion of iodine atoms to the total mass of the copolymer is preferably from 0.01 to 5.0 mass %, more preferably from 0.05 to 1.5 mass %, further preferably from 0.1 to 0.5 mass %. Within such a range, while rubber properties of the TFE/P copolymer are maintained, crosslinking will readily be conducted.

To introduce iodine atoms into the copolymer, a method of using a monomer containing an iodine atom as other monomer, or a method of using a chain transfer agent containing an iodine atom for polymerization may be mentioned. Preferred is a method of using a chain transfer agent, whereby iodine atoms are readily introduced into the main chain terminals of the copolymer and the crosslinking site can readily be controlled.

The chain transfer agent may be 1,4-diiodoperfluorobutane, 1,2-diiodoperfluoroethane, 1,3-diiodoperfluoropropane, 1,5-diiodoperfluoropentane or 1,6-diiodoperfluorohexane, and among them, 1,4-diiodoperfluorobutane is preferred.

As commercial products of the TFE/P copolymer, "AFLAS 100S", "AFLAS 100H", "AFLAS 150P", "AFLAS 150E", "AFLAS 150L", "AFLAS 150C", "AFLAS 150CS" and "AFLAS 300S" (manufactured by Asahi Glass Company, Limited) may, for example, be mentioned.

As the HFP/VdF copolymer, preferred is a copolymer in which the total amount of the HFP units and the VdF units to all units in the copolymer is from 50 to 100 mol %, and the molar ratio of VdF units/HFP units is from 60/40 to 95/5. The molar ratio of the VdF units to the HFP units is preferably from 70/30 to 90/10, more preferably from 75/25 to 85/15. The HFP/VdF copolymer may contain from 0.01 to 5.0 mass % of iodine atoms.

As units other than the HFP units and the VdF units, TFE units are preferred. In a case where the copolymer contains the HFP units, the VdF units and the TFE units, the total amount of the HFP units, the VdF units and the TFE units to all units in the copolymer is preferably from 98 to 100 mol %. Further, the molar ratio of VdF units/TFE units/HFP units is preferably from 50/5/45 to 65/30/5, more preferably from 50/15/35 to 65/20/15.

As units other than the HFP units, the TFE units and the VdF units, units based on the following other monomers may, for example, be mentioned.

Other monomer: chlorotrifluoroethylene, trifluoroethylene, vinyl fluoride, ethylene, ethylidene norbornene, vinyl crotonate.

The proportion of other units to all units is preferably at most 50 mol %, more preferably at most 30 mol %, further preferably at most 10 mol %.

As commercial products of the HFP/VdF copolymer, "DAI-EL G-801", "DAI-EL G-901", "DAI-EL G-902", "DAI-EL G-912", "DAI-EL G-952", "DAI-EL G-9074" and "DAI-EL G-9062" (manufactured by DAIKIN INDUSTRIES, LTD.), "Viton GF-600S" (manufactured by DuPont), "Tecnoflon P959", "Tecnoflon P459", "Tecnoflon P757" and "Tecnoflon P457" (manufactured by Solvay Specialty Polymers Japan K.K.) may, for example, be mentioned.

As the TFE/PAVE copolymer, preferred is a copolymer in which the total amount of the TFE units and the PAVE units is from 50 to 100 mol %, and the molar ratio of TFE units/PAVE units is from 20/80 to 80/20. The molar ratio of the TFE units to the PAVE units is preferably from 50/50 to 80/20, more preferably from 60/40 to 75/25. The TFE/PAVE copolymer may contain from 0.01 to 5.0 mass % of iodine atoms.

As PAVE, perfluoro(methyl vinyl ether), perfluoro(ethyl vinyl ether), perfluoro(propyl vinyl ether), perfluoro(methoxyethyl vinyl ether), perfluoro(propoxyethyl vinyl ether) or perfluoro(propoxypropyl vinyl ether) may, for example, be mentioned.

As units other than the TFE units and the PAVE units, units based on other monomers mentioned for the HFP/VdF copolymer, the HFP units and the VdF units may, for example, be mentioned.

The proportion of other units to all units is preferably at most 50 mol %, more preferably at most 30 mol %, further preferably at most 10 mol %.

The TFE/PAVE copolymer preferably contains iodine atoms. The proportion of iodine atoms to the total mass of the copolymer is preferably from 0.01 to 5.0 mass %, more preferably from 0.05 to 1.5 mass %, further preferably from 0.1 to 0.5 mass %. Within such a range, while rubber properties of the TFE/PAVE copolymer are maintained, crosslinking will easily be conducted.

The method for introducing iodine atoms into the copolymer and the preferred chain transfer agent are the same as those for the TFE/P copolymer.

As commercial products of the above-described (3) TFE/PAVE copolymer, Viton GLT and Viton GFLT (manufactured by DuPont Performance Elastomers) may, for example, be mentioned.

The elastic shear modulus G' of the copolymer is preferably from 100 kPa to 600 kPa, more preferably from 200 kPa to 500 kPa, further preferably from 200 kPa to 400 kPa. A higher elastic shear modulus G' means a higher molecular weight of the polymer and a higher density of entanglement of the molecular chain. When the elastic shear modulus G' of the copolymer is within the above range, favorable rubber properties of a crosslinked rubber are likely to be obtained. The elastic shear modulus G' is a value measured by the after-described method.

The hydrophilic silica contained in the composition of the present invention is silica particles the surface of which is not subjected to a hydrophobic treatment with e.g. hexamethyldisilazane or silicone oil, and the surface of which is hydrophilic. On the surface of the hydrophilic silica particles, usually a large amount of hydroxy groups are present. By the composition containing the hydrophilic silica, while favorable rubber properties of a crosslinked rubber formed from the composition are maintained, the metal adhesion can be increased. Further, a decrease of rubber properties by incorporation of the diatomaceous earth in the composition can be suppressed by incorporation of the hydrophilic silica.

The specific surface area of the hydrophilic silica is preferably at least 20 $m^2/g$, more preferably at least 30 $m^2/g$ and at most 1,000 $m^2/g$, further preferably at least 70 $m^2/g$ and at most 500 $m^2/g$, still more preferably at least 100 $m^2/g$ and at most 450 $m^2/g$, particularly preferably at least 150 $m^2/g$ and at most 400 $m^2/g$, most preferably at least 175 $m^2/g$ and at most 350 $m^2/g$.

When the specific surface area of the hydrophilic silica is at least 70 $m^2/g$, more preferably at least 100 $m^2/g$, further preferably at least 150 $m^2/g$, still more preferably at least 175 $m^2/g$, adhesion of a crosslinked product of the composition to a metal can be sufficiently improved even when the composition contains no diatomaceous earth.

When the specific surface area of the hydrophilic silica is at most 1,000 $m^2/g$, more preferably at most 500 $m^2/g$, further preferably at most 400 $m^2/g$, most preferably at most 350 $m^2/g$, dispersibility and operation properties of the hydrophilic silica at the time of producing the composition will be favorable.

The apparent specific gravity of the hydrophilic silica is preferably from 20 to 300 g/L, more preferably from 30 to 250 g/L, further preferably from 40 to 200 g/L. When the apparent specific gravity is within the above range, the composition has a handleable appropriate viscosity, a decrease of elongation of the crosslinked rubber can be suppressed, and a favorable hardness will be obtained.

The average primary particle size of the hydrophilic silica is preferably from 5 to 50 nm, more preferably from 6 to 45 nm, particularly preferably from 7 to 40 nm. When the average primary particle size is within the above range, dispersibility of the hydrophilic silica in the composition tends to be high.

The hydrophilic silica is classified into wet silica and dry silica usually according to its production process. Dry silica is preferred with a view to preventing void failure at the time of processing the crosslinked rubber.

The hydrophilic silica may be available as a commercial product and for example, AEROSIL 50, 200, 300 etc. manufactured by NIPPON AEROSIL CO., LTD. may, for example, be mentioned. The hydrophilic silica contained in the composition may be used alone or in combination of two or more.

The content of the hydrophilic silica in the composition is preferably from 1 to 50 parts by mass, more preferably from 5 to 30 parts by mass, further preferably from 10 to 20 parts by mass per 100 parts by mass of the copolymer. When the content is at least 1 part by mass, an effect to improve metal adhesion will be obtained, and when it is at most 50 parts by mass, a decrease of elongation at break of the crosslinked rubber can be suppressed.

In a case where the composition of the present invention contains diatomaceous earth, metal adhesion of a crosslinked rubber formed of the composition is increased. When the specific surface area of the hydrophilic silica in the composition is less than 70 $m^2/g$, even if improvement of metal adhesion by the hydrophilic silica is insufficient, adhesion of the crosslinked rubber to a metal can be improved by incorporation of the diatomaceous earth. Diatomaceous earth is a material derived from fossilized shells of diatoms. It is clearly distinguished from the silica particles by observation with a microscope. The diatomaceous earth contained in the composition is particularly preferably celite which is diatomaceous earth calcined together with a carbonate such as sodium carbonate.

As specific diatomaceous earth, CELITE 270, 281, 501, 503, 505, 512, 535, 545, 560, 577, Snow Floss, Super Floss (tradenames manufactured by Johns Manville, USA), Radiolite 100, 200, 300, 500, 600, 800, 900, FINE-FLOW B, F (tradenames manufactured by Show Chemical Industry Co., Ltd.), SILIKA 300S, 600S, 645, 6B (tradenames manufactured by Chuo Silika Co., Ltd.) and Celite 350 (manufactured by Imerys Filtration Minerals, Inc.) may, for example, be mentioned. Diatomaceous earth contained in the composition may be used alone or in combination of two or more.

The content of the diatomaceous earth in the composition is preferably from 1 to 50 parts by mass, more preferably from 3 to 30 parts by mass, further preferably from 5 to 20 parts by mass per 100 parts by mass of the copolymer. When it is at least 1 part by mass, an effect to improve metal adhesion will be obtained, and when it is at most 50 parts by mass, a decrease of rubber properties of a crosslinked rubber can be reduced.

The acid acceptor contained in the composition of the present invention is a chemical which neutralized an acidic substance generated when the copolymer in the composition is crosslinked. Further, by its basicity, radicals are stabilized, and a crosslinking reaction by a peroxide will rapidly and more securely proceed.

The acid acceptor may, for example, be a metal oxide or metal hydroxide of a monovalent alkali metal, a metal oxide or metal hydroxide of a bivalent metal, a metal oxide or metal hydroxide of a trivalent metal, or a composite metal oxide or composite metal hydroxide thereof.

Particularly, a metal oxide of a bivalent metal such as magnesium oxide (low activity, medium activity, high activity), calcium oxide, zinc oxide or lead oxide, a hydroxide of a bivalent metal such as calcium hydroxide, a metal oxide of a monovalent alkali metal such as sodium oxide, aluminum oxide, bismuth oxide, molecular sieves or hydrotalcite may, for example, be mentioned.

Specifically, as the acid acceptor, the following commercial products may be mentioned.

Low activity or medium activity magnesium oxide: KYOWAMAG 30 manufactured by Kyowa Chemical Industry Co., Ltd., STARMAG M, STARMAG A, STARMAG L and STARMAG P manufactured by Konoshima Chemical Co., Ltd., MAGLITE A manufactured by Hallstar, USA.

High activity magnesium oxide: KYOWAMAG 150 manufactured by Kyowa Chemical Industry Co., Ltd., STARMAG U and STARMAG R manufactured by Konoshima Chemical Co., Ltd., MAGLITE D manufactured by Hallstar, USA.

Hydrotalcite: DHT-4A manufactured by Kyowa Chemical Industry Co., Ltd.

Among them, in view of a high acid-accepting effect, the acid acceptor is preferably high activity magnesium oxide.

The acid acceptor contained in the composition may be used alone or in combination of two or more.

The content of the acid acceptor in the composition is preferably from 0.1 to 30 parts by mass, more preferably from 1 to 20 parts by mass, further preferably from 2 to 10 parts by mass per 100 parts by mass of the copolymer. Within the above range, physical properties of a crosslinked rubber will be excellent.

The composition of the present invention preferably contains a crosslinking agent. When the crosslinking agent is contained, a crosslinked product formed by crosslinking copolymer molecules in the composition will readily be obtained. Usually, the crosslinked product is a crosslinked rubber having rubber elasticity.

The crosslinking agent may, for example, be an organic peroxide, a polyol, an amine or triazine. Among them, preferred is an organic peroxide, whereby a crosslinked rubber excellent in steam resistance is likely to be obtained.

The organic peroxide is preferably one having a temperature at which the half life is one minute of from 130 to 220° C. Specifically, dibenzoyl peroxide, dicumyl peroxide, di(tert-butyl) peroxide, tert-butyl peroxyacetate, tert-butyl peroxyisopropylcarbonate, tert-butyl peroxybenzoate, 2,5-dimethyl-2,5-bis(tert-butylperoxy)hexane, 2,5-dimethyl-2,5-bis(tert-butylperoxy)hexyne-3, $\alpha,\alpha'$-bis(tert-butylperoxy)-p-diisopropylbenzene or 2,5-dimethyl-2,5-bis(benzoylperoxy)hexane may, for example, be mentioned. The crosslinking agent contained in the composition may be used alone or in combination of two or more.

The content of the organic peroxide in the composition is preferably from 0.01 to 10 parts by mass, more preferably from 0.1 to 5 parts by mass per 100 parts by mass of the copolymer. When the content is within the above range, a crosslinked rubber having excellent physical properties will easily be obtained.

The composition of the present invention preferably contains a crosslinking acid. When a crosslinking aid is contained, crosslinking of copolymer molecules in the composition will smoothly proceed, and a crosslinked rubber having excellent physical properties will be obtained.

The crosslinking aid may, for example, be a compound having at least two unsaturated bonds in one molecule. The crosslinking aid may, for example, be specifically triallyl cyanurate, triallyl isocyanurate, bismaleimide, ethylene glycol dimethacrylate, 1,4-butanediol dimethacrylate, trimethylolpropane trimethacrylate or divinylbenzene. Among them, triallyl cyanurate or triallyl isocyanurate is preferred. The crosslinking aid contained in the composition may be used alone or in combination of two or more.

The content of the crosslinking aid in the composition is preferably from 0.1 to 10 parts by mass, more preferably from 0.5 to 7 parts by mass per 100 parts by mass of the copolymer. When the content is within the above range, physical properties of a crosslinked product of the composition such as hardness or heat resistance will be excellent.

The composition of the present invention may contain other component. Other component may, for example, be a known elastomer which is a resin other than the above copolymer, or additives.

The content of the known elastomer is preferably from 0 to 50 parts by mass per 100 parts by mass of the copolymer.

It is also preferred that the composition of the present invention contains carbon black. Carbon black is useful not only as a filler of a crosslinked rubber but also as a reinforcing material for reinforcing the crosslinked rubber.

As the carbon black, furnace black, acetylene black, thermal black, channel black or graphite may, for example, be mentioned. Among them, furnace black or thermal black is more preferred in view of reinforcing properties. Specifically, HAF-LS, HAF, HAF-HS, FEF, GPF, APF, SRF-LM, SRF-HM or MT may, for example, be mentioned. The carbon black contained in the composition may be used alone or in combination of two or more.

The content of the carbon black in the composition is preferably from 1 to 50 parts by mass, more preferably from 5 to 50 parts by mass per 100 parts by mass of the copolymer. When it is at least the lower limit value of the above range, the hardness of the crosslinked rubber will be favorable, and when it is at most the upper limit value, elongation of the crosslinked rubber will be favorable.

The additive may, for example, be a filler, a processing aid, a dispersing aid, a plasticizer, a softening agent, an antioxidant or a bonding aid.

The filler other than the hydrophilic silica, the diatomaceous earth and the carbon black may, for example, be quartz powder, basic magnesium carbonate, activated calcium carbonate, magnesium silicate, aluminum silicate, titanium dioxide, talc, mica powder, aluminum sulfate, calcium sulfate, barium sulfate, asbestos, graphite, wollastonite, molybdenum disulfide, carbon fibers, aramid fibers, whiskers or glass fibers.

The processing aid may, for example, be a fatty acid derivative such as sodium stearate, calcium stearate or amide stearate, natural wax, synthetic wax or a surfactant. The dispersing aid may, for example, be a higher fatty acid or its amine salt. The plasticizer may, for example, be a phthalic acid derivative, an adipic acid derivative or a sebacic acid derivative. The softening agent may, for example, be a lubricating oil, a process oil, coal tar or castor oil.

The antioxidant may, for example, be phenylenediamine, a hindered amine, a phosphate, quinoline, cresol, phenol or a dithiocarbamate metal salt. The bonding aid may, for example, be a silane coupling agent or a titanate coupling agent. In addition, a coloring agent, an ultraviolet absorber, a flame retardant, an oil resistance-improving agent, a foaming agent, an antiscorching agent, a tackifier, a lubricant or the like may be blended as the case requires.

As the additive, titanium oxide is particularly preferred. By the composition containing titanium oxide, adhesion to a metal will improve. The content of the titanium oxide in the composition is preferably from 1 to 10 parts by mass, more preferably from 2 to 5 parts by mass per 100 parts by mass of the copolymer.

The composition of the present invention may be prepared by mixing the copolymer, the hydrophilic silica and the acid acceptor and as the case requires, other components such as the diatomaceous earth, the crosslinking agent, the crosslinking aid, the processing aid or the filler, by a kneading method using a kneading apparatus such as a roller, a Banbury mixer or an extruder.

The Mooney viscosity of the composition of the present invention is preferably from 10 to 130. When the Mooney viscosity is within the above range, processability, mechanical properties of the crosslinked product, etc. tend to be favorable. The Mooney viscosity of the composition is a value measured by using SMV-201 manufactured by Shimadzu Corporation in accordance with JIS K6300-1: 2013 by an L rotor having a diameter of 38.1 mm and a thickness of 5.54 mm at 121° C. for a preheating time of one minute for a rotor rotating time of 4 minutes.

<Method for Producing Crosslinked Rubber>

A crosslinked rubber is obtained by crosslinking the composition of the present invention. The composition may be crosslinked after formed into a desired shape, or may be crosslinked and then formed. The forming method and the crosslinking method are not particularly limited, and known methods are applicable. The crosslinking method may, for example, be crosslinking by hot pressing, steam crosslinking, hot air crosslinking or lead encasing crosslinking. The crosslinking treatment may be conducted by primary crosslinking and secondary crosslinking. By crosslinking in two stages, e.g. rubber properties of the crosslinked rubber can be stabilized. As the primary crosslinking conditions, a method of heating at from 100 to 200° C. for from several seconds to 24 hours may, for example, be mentioned. As the secondary crosslinking conditions, a method of heating at from 100 to 300° C. for from about 30 minutes to about 48 hours may, for example, be mentioned.

The hardness of the crosslinked rubber is preferably from 60 to 99, more preferably from 60 to 90, further preferably from 65 to 85.

The elongation at break of the crosslinked rubber is preferably at least 100%, more preferably at least 150%, further preferably at least 200%. The upper limit is not particularly limited and is usually at most 500%.

The tensile strength (strength) of the crosslinked rubber is preferably at least 8 MPa, more preferably at least 10 MPa, further preferably at least 15 MPa. The upper limit is not particularly limited and is usually at most 40 MPa.

The 100% tensile stress of the crosslinked rubber is preferably at least 3 MPa, more preferably at least 4 MPa, further preferably at least 5 MPa. The upper limit is not particularly limited and is usually at most 15 MPa.

The compression set of the crosslinked rubber is preferably at most 50%, more preferably at most 40%, further preferably at most 30%. The lower limit is not particularly limited and is usually at least 1%.

The specific gravity of the crosslinked rubber is usually within a range of from 1.4 to 1.8.

The hardness, the elongation at break, the tensile strength, the tensile stress, the compression set and the specific gravity of the crosslinked rubber are values measured by the after-described methods.

(Mechanism of Action)

With the above-described fluorinated copolymer composition of the present invention, which contains hydrophilic silica, the metal adhesion of the crosslinked rubber can be improved without impairing rubber properties. When the composition contains diatomaceous earth in addition to the hydrophilic silica, metal adhesion of the crosslinked rubber can be further improved. It is estimated that hydroxy groups present on the surface of the hydrophilic silica and the diatomaceous earth contribute to improvement of metal adhesion. Further, deterioration of rubber properties of the crosslinked product by incorporation of the diatomaceous earth can be suppressed by incorporation of the hydrophilic silica.

<Metal Rubber Laminate>

The metal rubber laminate of the present invention comprises a crosslinked rubber layer formed of a crosslinked product of the fluorinated copolymer composition of the present invention and a metal substrate. It preferably has an adhesive layer between the crosslinked rubber layer and the metal substrate.

The adhesive is preferably a silane coupling agent-based adhesive. The silane coupling agent-based adhesive has favorable adhesion to a metal and also has favorable adhesion to the crosslinked product of the fluorinated copolymer composition of the present invention. The silane coupling agent-based adhesive may, for example, be VT-200, QZR-48, CF-5M, D-602, MP-204 or VM-3A manufactured by Yokohama Kobunshi Kenkyujo Co., Ltd., and among them, MP-204 or VM-3A is preferred.

The thickness of the adhesive layer is preferably from 0.1 to 30 μm, more preferably from 1.0 to 20 μm. Within such a range, favorable adhesion is achieved and further, by a small thickness of the adhesive layer, it is considered that the crosslinked rubber layer and the metal substrate layer are partially in contact with each other to form a bond between the crosslinked rubber and the metal, whereby metal adhesion will further improve.

The thickness of the crosslinked rubber layer is not particularly limited and may, for example, be from about 1 mm to about 100 mm.

The surface of the crosslinked rubber layer and the metal substrate may be flat, or may be a non-flat surface such as an irregular surface or a curved surface.

The metal material constituting the metal substrate is not particularly limited and may, for example, be a general steel material (such as SPCC or SS400), a stainless steel material, aluminum, a copper alloy material or an aluminum alloy material. The shape of the metal substrate is not particularly limited, and a shape depending upon the application of the metal rubber laminate is applicable.

<Method for Producing Metal Rubber Laminate>

The metal rubber laminate of the present invention is produced preferably by a method of forming an adhesive layer on a metal substrate, forming a layer formed of the fluorinated copolymer composition of the present invention on the adhesive layer, and crosslinking the layer formed of the composition. That is, the crosslinked rubber layer is preferably formed of a crosslinked rubber formed by subjecting the composition of the present invention to a crosslinking reaction in a state where it is in contact with the adhesive layer on the metal substrate, whereby adhesion of the crosslinked rubber layer to the metal substrate in the metal rubber laminate of the present invention will further improve.

EXAMPLES

Now, the present invention will be described in further detail with reference to Examples. However, it should be understood that the present invention is by no means restricted to such specific Examples.

<Measurement Method>

[Composition of Copolymer]

The composition of the copolymer (molar ratio of the units) was obtained by $^{19}F$-nuclear magnetic resonance (NMR) analysis, fluorine content analysis and infrared absorption spectrum analysis.

[Iodine Content of Copolymer]

The iodine content of the copolymer was quantitatively determined by an apparatus which is a combination of automatic quick furnace combustion apparatus AQF-100 manufactured by Dia Instruments Co., Ltd. and ion chromatography.

[Elastic Shear Modulus G' of Copolymer]

The elastic shear modulus G' is a value measured by using RPA2000 manufactured by ALPHA TECHNOLOGIES, in accordance with ASTM D5289 and D6204 at a temperature of 100° C. at an amplitude of 0.5° at a frequency of 50/min.

<Evaluation of Physical Properties of Crosslinked Rubber>

[100% Tensile Stress, Tensile Strength and Elongation at Break]

The fluorinated copolymer composition is subjected to primary crosslinking by hot pressing at 160° C. for 10 minutes and then subjected to secondary crosslinking by heating in an oven at 200° C. for 4 hours to obtain a crosslinked rubber sheet having a thickness of 2 mm. The obtained crosslinked rubber sheet was punched by a No. 3 dumbbell to prepare a sample.

In accordance with JIS K6251, the 100% tensile stress, the tensile strength and the elongation at break were measured.

The hardness (SHORE A) was measured in accordance with JIS K6253.

[Measurement of Specific Gravity]

The specific gravity of the crosslinked rubber was measured by a method in accordance with JIS K6220-1 using a specific gravity meter manufactured by SHINKO DENSHI CO., LTD.

[Measurement of Compression Set (CS)]

The fluorinated copolymer composition was subjected to primary crosslinking by hot pressing at 160° C. for 10 minutes and then subjected to secondary crosslinking by heating in an oven at 200° C. for 4 hours to obtain a crosslinked rubber plate having a thickness of 12.5 mm. Using the crosslinked rubber plate, a compression set test was carried out in accordance with JIS K6262 at 200° C. for 70 hours to measure the compression set of the crosslinked rubber.

[Evaluation of Metal Adhesion]

In accordance with JIS K6256-2, with respect to a metal rubber laminate having a rigid substrate and a test specimen formed of a crosslinked rubber bonded via an adhesive (Monicas-204, manufactured by Yokohama Kobunshi Kenkyujo Co., Ltd.), 90° peel test was carried out at room temperature (25° C.).

As the rigid substrate, a cold-rolled plate (SPCC), a stainless steel plate (SUS304, SUS316) or an aluminum plate, having a thickness of 2±0.5 mm, a width of 25±1 mm and a length of 60±1 mm, was used. The size of the test specimen formed of the crosslinked rubber was a thickness of 5±0.5 mm, a width of 25±1 mm and a length of 125±3 mm. The bonding area of the rigid substrate and the test specimen was a thickness of 19±0.1 mm and a length of 20±1 mm.

Before the test specimen was bonded to the rigid substrate, the bonding surface of the rigid substrate was washed with acetone, the washed surface was coated with the adhesive by dipping, followed by baking at 160° C. for 10 minutes, and the baked surface was coated with the adhesive by dipping, followed by baking at 210° C. for 30 minutes. The thickness of the adhesive layer was from 5 to 10 μm. Then, to the predetermined bonding surface having the adhesive baked, a non-crosslinked fluorinated copolymer composition formed into predetermined dimensions was bonded, followed by primary crosslinking treatment (at 160° C. for 10 minutes) and secondary crosslinking treatment (at 200° C. for 14 hours) by hot pressing in Examples 1 to 7 and Comparative Examples 1 to 12. In Examples 8 to 10 and Comparative Examples 13 and 14, primary and secondary crosslinking treatments were carried out in the same manner as above except that the primary crosslinking treatment was carried out at 145° C. for 20 minutes. By a series of the crosslinking treatments, the fluorinated copolymer composition was formed into a test specimen formed of a crosslinked rubber having predetermined dimensions. Then, steam exposure treatment (at 135° C. for 70 hours or at 170° C. for 70 hours) was conducted.

The adhesions of the test specimen after the secondary crosslinking treatment and after the steam exposure treatment were evaluated based on the following standards.

Pulling was terminated when material failure occurred in the test specimen formed of the crosslinked rubber, the bonding area between the rigid substrate and the test specimen was measured, and a test specimen having a bonding area closer to 100% of the bonding area before the test was evaluated to have more excellent adhesion. The same test was conducted twice with respect to the same test specimen, and the average bonding area was evaluated.

Excellent (⊚): bonding area at the time of material failure is at least 95%

Favorable (○): bonding area at the time of material failure is at least 90% and less than 95%

Average (Δ): bonding area at the time of material failure is at least 50% and less than 90%

Poor (x): bonding area at the time of material failure is less than 50%

<Components Contained in Fluorinated Copolymer Composition>

Copolymer A: a copolymer having TFE units, C3DVE units and P units, having a proportion of the TFE units of 56 mol %, a proportion of the P units of 43.8 mol % and a proportion of the C3DVE units of 0.2 mol % to the total amount of all units constituting the copolymer A, and G' of 330 kPa and containing 0.5 mass % of iodine atoms to the total mass of the copolymer. The copolymer A may be produced by the method disclosed in WO2017/057512.

Copolymer B: a copolymer having TFE units and P units, having a proportion of the TFE units of 56 mol % and a proportion of the P units of 44 mol % to the total amount of all units constituting the copolymer B, and G' of 280 kPa, and containing 0.4 mass % of iodine atoms to the total mass of the copolymer. The copolymer B may be produced by the method disclosed in WO2009/119202.

Copolymer C: AFLAS 150P (tradename, manufactured by Asahi Glass Company, Limited), a copolymer having TFE units and P units, and a proportion of the TFE units of 56 mol % and a proportion of the P units of 44 mol % to the total amount of all units constituting the copolymer C, and G' of 240 kPa.

Copolymer D: a copolymer having TFE units and PMVE units, having a proportion of the TFE units of 69 mol % and a proportion of the PMVE units of 31 mol % to the total amount of all units constituting the copolymer D, G' of 550 kPa and a Mooney viscosity of 180, and containing 0.15 mass % of iodine atoms to the total mass of the copolymer. The copolymer D may be produced by the method disclosed in WO2010/082633.

Carbon black: THERMAX N-990 (tradename), manufactured by Cancarb.

Crosslinking aid A: 1,3,5-triallylisocyanurate, TAIC (tradename), manufactured by Mitsubishi Chemical Corporation.

Crosslinking aid B: 1,3,5-triallylisocyanurate, TAIC WH-60 (tradename), manufactured by Mitsubishi Chemical Corporation.

Processing aid A: calcium stearate, manufactured by FUJIFILM Wako Pure Chemical Corporation.

Processing aid B: nonionic surfactant, Emaster 510P (tradename), manufactured by RIKEN VITAMIN CO., LTD.

Crosslinking agent A: α,α'-bis(tert-butylperoxy)-p-diisopropylbenzene, PERKADOX 14 (tradename) (abbreviated name: P-14), manufactured by Kayaku Akzo Corporation.

Crosslinking agent B: 2,5-dimethyl-2,5-bis(tert-butylperoxy)hexane, PERHEXA (registered trademark) 25B (abbreviated name: PERHEXA 25B), manufactured by NOF Corporation.

Acid acceptor: MgO powder, KYOWAMAG 150 (tradename), manufactured by Kyowa Chemical Industry Co., Ltd.

Diatomaceous earth: celite, Celite 350 (tradename), manufactured by Imerys Filtration Minerals, Inc.

Hydrophilic silica A: AEROSIL 50 (tradename), specific surface area $50\pm15$ m$^2$/g, apparent specific gravity: about 50 g/L, average primary particle size: 30 nm, manufactured by NIPPON AEROSIL CO., LTD.

Hydrophilic silica B: AEROSIL 200 (tradename), specific surface area $200\pm25$ m$^2$/g, apparent specific gravity: about 50 g/L, average primary particle size: 12 nm, manufactured by NIPPON AEROSIL CO., LTD.

Hydrophilic silica C: AEROSIL 300 (tradename), specific surface area $300\pm30$ m$^2$/g, apparent specific gravity: about 50 g/L, average primary particle size: 7 nm, manufactured by NIPPON AEROSIL CO., LTD.

Filler: TiO$_2$ powder

Hydrophobic silica: AEROSIL RX200 (tradename), specific surface area $140\pm25$ m$^2$/g, apparent specific gravity: about 50 g/L, average primary particle size: 12 nm, manufactured by NIPPON AEROSIL CO., LTD.

EXAMPLES, COMPARATIVE EXAMPLES

The components were uniformly kneaded in a bland ratio (mass ratio) as identified in Tables 1 and 2 by a twin roll mill to prepare a fluorinated copolymer composition. From each composition, a test specimen of a crosslinked rubber was prepared by the above-described method, and physical properties were evaluated. The results are shown in Tables 3 and 4.

TABLE 1

| | Examples | | | | | | | | | |
|---|---|---|---|---|---|---|---|---|---|---|
| No. | 1 | 2 | 3 | 4 | 5 | 6 | 7 | 8 | 9 | 10 |
| Copolymer A | 100 | 100 | 100 | 100 | 100 | | | | | |
| Copolymer B | | | | | | 100 | | | | |
| Copolymer C | | | | | | | 100 | | | |
| Copolymer D | | | | | | | | 100 | 100 | 100 |
| Carbon black | | | | | | | | | | |
| Crosslinking aid A | 3 | 3 | 3 | 3 | 3 | 5 | 5 | | | |

TABLE 1-continued

|  | Examples | | | | | | | | | |
|---|---|---|---|---|---|---|---|---|---|---|
| No. | 1 | 2 | 3 | 4 | 5 | 6 | 7 | 8 | 9 | 10 |
| Crosslinking aid B |  |  |  |  |  |  |  | 5 | 5 | 5 |
| Crosslinking agent A |  |  |  |  |  |  |  |  |  |  |
| Crosslinking agent B | 1 | 1 | 1 | 1 | 1 | 1 | 1 | 1 | 1 | 1 |
| Processing aid A | 1 | 1 | 1 | 1 | 1 | 1 | 1 | 1 | 1 | 1 |
| Processing aid B |  |  |  |  |  |  |  |  |  |  |
| Hydrophobic silica |  |  |  |  |  |  |  |  |  |  |
| Diatomaceous earth | 5 |  | 5 |  | 5 | 5 | 5 | 5 |  |  |
| Acid acceptor | 3 | 3 | 3 | 3 | 3 | 3 | 3 | 3 | 3 | 3 |
| Hydrophilic silica A | 15 |  |  |  |  |  |  | 15 |  |  |
| Hydrophilic silica B |  | 10 | 10 |  |  |  |  |  | 10 |  |
| Hydrophilic silica C |  |  |  | 10 | 10 | 10 | 10 |  |  | 10 |
| Filler | 3 | 3 | 3 | 3 | 3 | 3 | 3 | 3 | 3 | 3 |

TABLE 2

|  | Comparative Examples | | | | | | | | | | | | | |
|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 |
| Copolymer A |  | 100 | 100 |  | 100 |  |  | 100 | 100 | 100 | 100 | 100 |  |  |
| Copolymer B |  |  |  | 100 |  | 100 |  |  |  |  |  |  |  |  |
| Copolymer C | 100 |  |  |  |  |  | 100 |  |  |  |  |  |  |  |
| Copolymer D |  |  |  |  |  |  |  |  |  |  |  |  | 100 | 100 |
| Carbon black | 30 | 30 | 30 | 30 | 10 | 10 | 10 |  |  |  |  |  | 10 | 2 |
| Crosslinking aid A | 5 | 3 | 3 | 5 | 3 | 5 | 5 | 3 | 3 | 3 | 3 | 3 |  |  |
| Crosslinking aid B |  |  |  |  |  |  |  |  |  |  |  |  | 5 | 5 |
| Crosslinking agent A | 1 |  | 1 |  |  |  | 1 |  |  |  |  |  |  |  |
| Crosslinking agent B |  | 1 |  | 1.5 | 1 | 1.5 |  | 1 | 1 | 1 | 1 | 1 | 1 | 1 |
| Processing aid A | 1 | 1 | 1 | 1 | 1 | 1 | 1 | 1 | 1 | 1 | 1 | 1 | 1 | 1 |
| Processing aid B |  |  |  | 2 |  |  |  |  |  |  |  |  |  |  |
| Hydrophobic silica |  |  |  |  |  |  |  |  |  |  |  | 15 |  |  |
| Diatomaceous earth |  |  |  |  | 20 | 20 | 20 | 5 |  | 5 |  | 5 |  |  |
| Acid acceptor |  |  |  |  | 3 | 3 | 3 |  |  |  | 3 | 3 |  | 15 |
| Hydrophilic silica A |  |  |  |  |  |  |  | 15 |  |  | 15 |  |  | 3 |
| Hydrophilic silica B |  |  |  |  |  |  |  |  |  |  |  |  |  |  |
| Hydrophilic silica C |  |  |  |  |  |  |  |  | 10 | 10 |  |  |  |  |
| Filler |  |  |  |  |  |  |  | 3 | 3 | 3 | 3 | 3 |  |  |

TABLE 3

|  | Examples | | | | | | | | | |
|---|---|---|---|---|---|---|---|---|---|---|
|  | 1 | 2 | 3 | 4 | 5 | 6 | 7 | 8 | 9 | 10 |
| <Physical properties> | | | | | | | | | | |
| Hardness | 72 | 69 | 70 | 71 | 72 | 72 | 71 | 78 | 77 | 78 |
| Tensile strength (MPa) | 18 | 19 | 19 | 20 | 19 | 10 | 15 | 22 | 23 | 24 |
| 100% Tensile stress (MPa) | 8 | 4 | 5 | 5 | 7 | 5 | 5 | 7 | 8 | 6 |
| Specific gravity | 1.6 | 1.6 | 1.6 | 1.6 | 1.6 | 1.6 | 1.6 | 2.1 | 2.1 | 2.1 |
| Elongation at break (%) | 217 | 280 | 288 | 257 | 225 | 420 | 250 | 198 | 195 | 190 |
| Compression set | 17 | 18 | 18 | 17 | 17 | 49 | 33 | 11 | 12 | 12 |
| <Metal adhesion> | | | | | | | | | | |
| After secondary crosslinking treatment (200° C., 4 h) | ◎ | ◎ | ◎ | ◎ | ◎ | ◎ | ◎ | ◎ | ◎ | ◎ |
| After steam exposure treatment (135° C., 70 h) | ◎ | ○ | ◎ | ○ | ◎ | ◎ | ◎ | ◎ | ○ | ○ |
| After steam exposure treatment (170° C., 70 h) | ◎ | Δ | ◎ | Δ | ◎ | ◎ | ◎ | ◎ | Δ | Δ |

TABLE 4

| | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| <Physical properties> | | | | | | | | | | | | | | |
| Hardness | 70 | 70 | 71 | 70 | 70 | 71 | 71 | 72 | 70 | 73 | 71 | 72 | 74 | 75 |
| Tensile strength (MPa) | 17 | 21 | 23 | 12 | 13 | 7 | 10 | 19 | 25 | 20 | 21 | 18 | 25 | 18 |
| 100% Tensile stress (MPa) | 5 | 5 | 6 | 4 | 8 | 7 | 8 | 7 | 4 | 6 | 4 | 5 | 8 | 8 |
| Specific gravity | 1.6 | 1.6 | 1.6 | 1.6 | 1.6 | 1.6 | 1.6 | 1.6 | 1.6 | 1.6 | 1.6 | 1.6 | 2.1 | 2.1 |
| Elongation at break (%) | 280 | 250 | 220 | 460 | 200 | 320 | 205 | 263 | 318 | 282 | 288 | 245 | 200 | 140 |
| Compression set | 29 | 14 | 14 | 45 | 23 | 58 | 42 | 15 | 16 | 17 | 15 | 18 | 10 | 16 |
| <Metal adhesion> | | | | | | | | | | | | | | |
| After secondary crosslinking treatment (200° C., 4 h) | Δ | Δ | Δ | Δ | ◎ | ◎ | ◎ | X | X | X | Δ | X | X | ◎ |
| After steam exposure treatment (135° C., 70 h) | X | X | X | X | ◎ | ◎ | ◎ | X | X | X | X | X | X | ◎ |
| After steam exposure treatment (170° C., 70 h) | X | X | X | X | ◎ | ◎ | ◎ | X | X | X | X | X | X | ◎ |

A crosslinked rubber containing diatomaceous earth, hydrophilic silica and an acid acceptor had excellent adhesion to a metal in each case where the hydrophilic silica had a specific surface area of from 35 to 330 m²/g, and its excellent adhesion was maintained even after the steam exposure.

A crosslinked rubber containing no diatomaceous earth and containing hydrophilic silica and an acid acceptor, had excellent adhesion to a metal, and a decrease of adhesion after the steam exposure was suppressed when the hydrophilic silica had a specific surface area of at least 70 m²/g.

A crosslinked rubber containing none of diatomaceous earth, hydrophilic silica and acid acceptor was inferior in adhesion to a metal.

A crosslinked rubber containing diatomaceous earth and hydrophilic silica and containing no acid acceptor was inferior in adhesion to a metal.

A crosslinked rubber containing diatomaceous earth and an acid acceptor and containing no hydrophilic silica was inferior in tensile strength and rubber properties regarding compression set.

A crosslinked rubber containing diatomaceous earth, hydrophobic silica and an acid acceptor and containing no hydrophilic silica was inferior in adhesion to a metal.

This application is a continuation of PCT Application No. PCT/JP2018/037277, filed on Oct. 4, 2018, which is based upon and claims the benefit of priority from Japanese Patent Application No. 2017-196075 filed on Oct. 6, 2017. The contents of those applications are incorporated herein by reference in their entireties.

What is claimed is:

1. A fluorinated copolymer composition, comprising:
   a fluorinated copolymer, which is a copolymer having units based on tetrafluoroethylene and units based on propylene, a copolymer having units based on tetrafluoroethylene and units based on a perfluoro(alkyl vinyl ether), or a copolymer having units based on hexafluoropropylene and units based on vinylidene fluoride;
   hydrophilic silica having a specific surface area of less than 70 m²/g;
   diatomaceous earth; and
   an acid acceptor.

2. The fluorinated copolymer composition according to claim 1, further comprising:
   a crosslinking agent.

3. The fluorinated copolymer composition according to claim 2, wherein the crosslinking agent is an organic peroxide.

4. The fluorinated copolymer composition according to claim 1, further comprising:
   a crosslinking aid.

5. The fluorinated copolymer composition according to claim 1, further comprising:
   titanium oxide.

6. The fluorinated copolymer composition according to claim 1, wherein the fluorinated copolymer is the copolymer having units based on tetrafluoroethylene and units based on propylene.

7. The fluorinated copolymer composition according to claim 1, wherein the acid acceptor is magnesium oxide.

8. A metal rubber laminate, comprising:
   a crosslinked rubber layer formed of a crosslinked product of the fluorinated copolymer composition of claim 1; and
   a metal substrate.

9. The metal rubber laminate according to claim 8, wherein the crosslinked rubber layer and the metal substrate are in contact with each other.

10. The metal rubber laminate according to claim 8, further comprising:
    an adhesive layer between the crosslinked rubber layer and the metal substrate.

11. A method for producing a metal rubber laminate, comprising:
    forming an adhesive layer on a metal substrate;
    forming a layer formed of the fluorinated copolymer composition of claim 1 on the adhesive layer; and
    crosslinking the layer formed of the fluorinated copolymer composition.

12. The fluorinated copolymer composition according to claim 1, comprising 5 to 20 parts by mass of the diatomaceous earth per 100 parts by mass of the fluorinated copolymer.

13. The fluorinated copolymer composition according to claim 1, comprising 10 to 20 parts by mass of the hydrophilic silica per 100 parts by mass of the fluorinated copolymer.

14. The fluorinated copolymer composition according to claim 1, wherein a crosslinked product of the fluorinated copolymer composition obtained by hot pressing the fluorinated copolymer composition at 160° C. for 10 minutes and then heating in an oven at 200° C. for 4 hours has a tensile strength of at least 15 MPa.

15. The fluorinated copolymer composition according to claim 1, wherein a crosslinked product of the fluorinated copolymer composition obtained by hot pressing the fluorinated copolymer composition at 160° C. for 10 minutes and then heating in an oven at 200° C. for 4 hours has a compression set of 30% or less.

16. The fluorinated copolymer composition according to claim 1, wherein a crosslinked product of the fluorinated copolymer composition obtained by hot pressing the fluorinated copolymer composition at 160° C. for 10 minutes and then heating in an oven at 200° C. for 4 hours has a tensile strength of at least 15 MPa and a compression set of 30% or less.

17. The fluorinated copolymer composition according to claim 1, wherein the diatomaceous earth is diatomaceous earth calcined together with a carbonate.

18. The fluorinated copolymer composition according to claim 1, comprising 2 to 10 parts by mass of the acid acceptor per 100 parts by mass of the fluorinated copolymer.

19. The fluorinated copolymer composition according to claim 5, comprising 2 to 5 parts by mass of the titanium oxide per 100 parts by mass of the fluorinated copolymer.

* * * * *